United States Patent [19]

Nakamura et al.

[11] Patent Number: 4,646,194
[45] Date of Patent: Feb. 24, 1987

[54] PG YOKE POSITION DETECTING APPARATUS

[75] Inventors: Shigekazu Nakamura; Osamu Kitazawa; Masao Nakamori; Yoshiyuki Ohzeki, all of Tokyo, Japan

[73] Assignee: Copal Company Limited, Tokyo, Japan

[21] Appl. No.: 818,379

[22] Filed: Jan. 13, 1986

[30] Foreign Application Priority Data

Jan. 13, 1985 [JP] Japan .................................. 60-15426
Jan. 31, 1985 [JP] Japan .................................. 60-15427

[51] Int. Cl.$^4$ ............................................. G11B 5/012
[52] U.S. Cl. ................................................... 360/137
[58] Field of Search ........................................ 360/137

[56] References Cited

U.S. PATENT DOCUMENTS 3,974,524 8/1976 Griffiths et al. ..................... 360/75
4,005,491 1/1977 Walker et al. ...................... 360/105
4,376,961 3/1983 Torii et al. .......................... 360/106
4,516,177 5/1985 Moon et al. .......................... 360/77
4,568,988 2/1986 McGinlay et al. ................... 360/77

Primary Examiner—George G. Stellar
Attorney, Agent, or Firm—Lynn L. Augspurger

[57] ABSTRACT

A magnetoresistance element is arranged in a plane parallel to the end face of a PG yoke and is situated on the outer side of a circle described by revolution of the PG yoke end face and in close proximity to the end face to detect a characteristic flux component emitted from the PG yoke end face. The magnetoresistance element is disposed in such a manner that an acute angle is formed between the direction of a current flowing in the element and a normal line extending from the axis of rotation of a recording medium. A flux component hardly influenced by the area of the PG yoke end face is thus detected.

8 Claims, 15 Drawing Figures

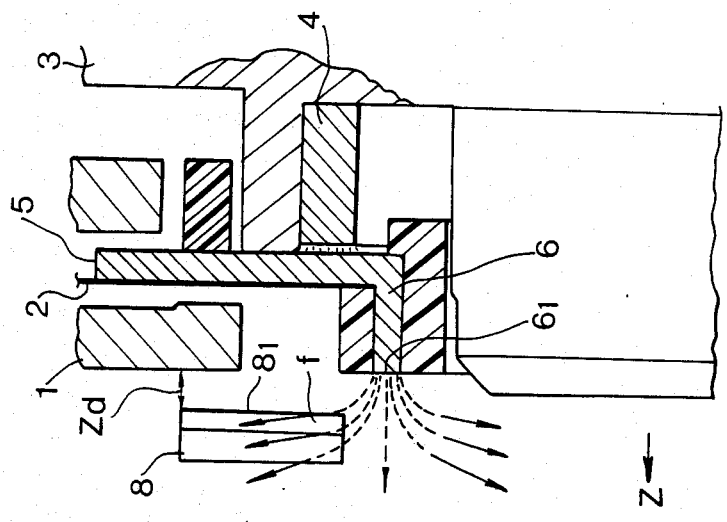
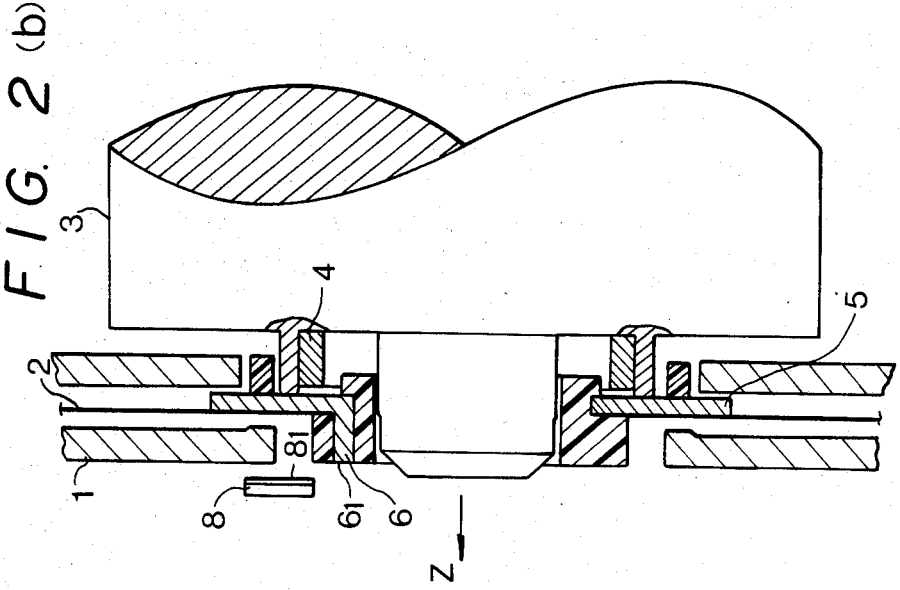

PG YOKE POSITION DETECTING APPARATUS

BACKGROUND OF THE INVENTION

1. Field of the Invention:

This invention relates to a PG yoke position detecting apparatus for detecting a rotation reference position of a yoke, referred to as a PG yoke, used in detecting the rotation reference position of a recording medium in a floppy disc system for recording and/or reading the picture or data of an electronic still camera or video floppy disc (VFD).

2. Description of the Prior Art:

In a floppy disc for an electronic still camera the general standards whereof have been roughly defined, the disc includes a center hub provided with a metal plate for being attracted by a magnet. Upstanding from a portion of the metal plate is a PG yoke used for detecting a picture or data recording start position. FIGS. 1(a) and 1(b) illustrate a conventional PG yoke position detecting mechanism, in which FIG. 1(a) is a front view and FIG. 1(b) a sectional view taken along line A—A of FIG. 1(a). A magnetic recording medium 2 accommodated in a hard case or cassette 1 includes a center hub having a yoke 5 from a portion of which an upstanding PG yoke 6 is formed. The electronic still camera that receives the cassette 1 includes a motor spindle 3 and an attracting magnet 4. The magnet 4 attracts the yoke 5 of the recording medium 2, thereby holding the recording medium 2 fast to the motor spindle 3 so that medium 2 may be rotated by the spindle 3. The magnet 4 produces a flux which exits from the end face $6_1$ of the PG yoke 6. When the spindle motor (not shown) is rotated, thereby rotating the recording medium 2 and, hence, the PG yoke 6, this causes an induced electromotive force to be produced in a PG coil 7, which is arranged directly opposite the PG yoke 6, at a rate of once per revolution of the recording medium 2. However, since the electromotive force detected by the PG coil 7 varies in dependence upon the rotating speed of the recording medium 2, it is difficult for the PG coil 7 to detect a reference position in a stable manner. Moreover, since the polarity of the induced electromotive force will differ depending upon the pole orientation, either N or S, of the attracting pole of magnet 4 provided on the electronic still camera, inconveniences are encountered in terms of manufacture control, adjustment and interchangeability of the apparatus. Though using a Hall device will solve the problem of a variation in amplitude with the rotational speed of the recording medium, the problem of a difference in polarity stemming from the magnetic pole orientation of the magnet 4 remains. Futhermore, if a Hall device is used, the extracted signal is small in magnitude. As a result, highly reliable position detection is difficult with such an apparatus in an environment in which field noise is prominent. Further, with regard to the detection of field leakage from the PG yoke in the conventional PG yoke position detecting apparatus, which flux component should be picked up as a signal to contribute to an improved S/N ratio is not given any consideration whatsoever. This fact also makes it difficult to realize an apparatus capable of highly accurate, reliable detection.

SUMMARY OF THE INVENTION

An object of the present invention is to provide a PG yoke position detection apparatus in which the S/N ratio is greatly improved through a simple construction by picking up a flux component that contributes most to PG yoke detection.

Another object of the present invention is to provide a PG yoke position detection apparatus in which highly accurate and highly reliable detection of position is made possible through a simple arrangement which includes a plurality of magnetoresistance elements.

According to the present invention, the foregoing objects are attained by providing a PG yoke position detecting apparatus for detecting a rotation reference position of a PG yoke used in detecting a rotation reference position of a recording medium, the apparatus comprising PG yoke detecting means provided with a magnetoresistance element disposed in plane lying substantially parallel to a plane in which the recording medium rotates and arranged in such a manner that an acute angle is formed between a direction of a drive current that flows through the magnetoresistance element and a normal line from a rotational axis of the recording medium. Preferably, the absolute value of the acute angle lies in a range of from 20° to 70°.

In a preferred embodiment of the invention, the PG yoke detecting means includes first and second magnetoresistance elements lying on the circumference of a circle the center whereof lies on the rotational axis of the recording medium. When an acute angle formed between the drive current of the first magnetoresistance element and a first normal line is $\theta$, an acute angle formed between the drive current of the second magnetoresistance element and a second normal line is $-\theta$. An angle formed between the first normal line and a normal line passing through a rotation reference position of the recording medium and an angle formed between the second normal line and the normal line passing through the rotation reference position of the recording medium are symmetrical. In a preferred embodiment, the absolute value of the angle formed between the first and second normal lines and the normal line passing through the rotation reference position of the recording medium lies in a range of from 20° to 70°.

In a preferred embodiment, the PG yoke detecting means includes a plurality of parallel magnetoresistance elements on the same normal line from the rotational axis of the recording medium.

According to the present invention, the foregoing objects are attained by providing a PG yoke position detecting apparatus for detecting a rotation reference position of a PG yoke used in detecting a rotation reference position of a recording medium, the apparatus comprising: PG yoke detecting means provided with first, second third and fourth magnetoresistance elements disposed in plane lying substantially parallel to a plane in which the recording medium rotates, the first and second magnetoresistance elements being provided at prescribed positions on a first normal line, which forms a prescribed angle with a normal line extending from a rotational axis of the recording medium and passing through a rotation reference position of the PG yoke, and arranged in such a manner that an acute angle is formed between a direction of a drive current that flows through each of the first and second magnetoresistance elements and the first normal line, second third and fourth magnetoresistance elements being provided at prescribed positions on a second normal line, which forms a prescribed angle with the normal line extending from the rotational axis of the recording medium and passing through the rotation reference position of the PG yoke and which is symmetrical with respect to the first normal line, and arranged in such a manner that an acute angle is formed between a direction of a drive current that flows through each of the third and fourth magnetoresistance elements and the second normal line; a bridge circuit having a first side composed of a series circuit comprising the first and second magnetoresistance elements and a second side composed of a series circuit comprising the third and fourth magnetoresistance elements; and an amplifier circuit for amplifying a difference between a divided voltage resulting from the first and second magnetoresistance elements and a divided voltage resulting from the first and fourth magnetoresistance elements.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3(b) is a sectional view of FIG. 3(a);

DESCRIPTION OF THE PREFERRED EMBODIMENT

A preferred embodiment of the present invention will now be described with reference to the drawings.

Figure 1:
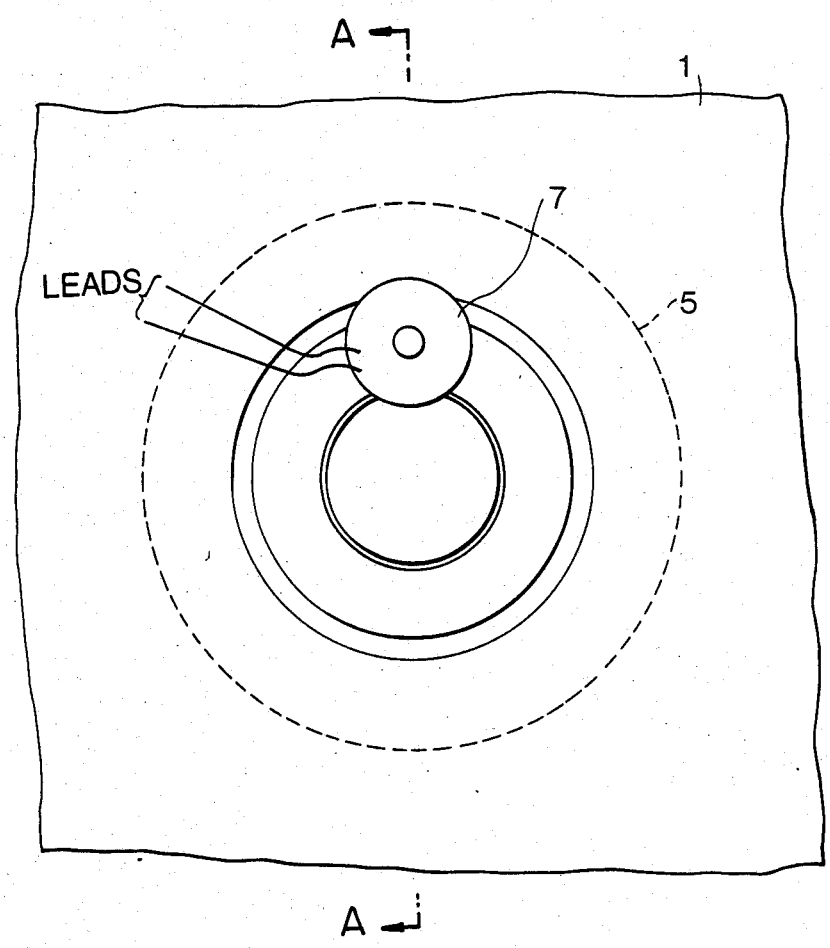
FIG. 1(a) is a front view showing a PG yoke position detecting mechanism according to the prior art.
FIG. 1(b) is a sectional view taken along line A—A of FIG. 1(a)
Figure 1B:
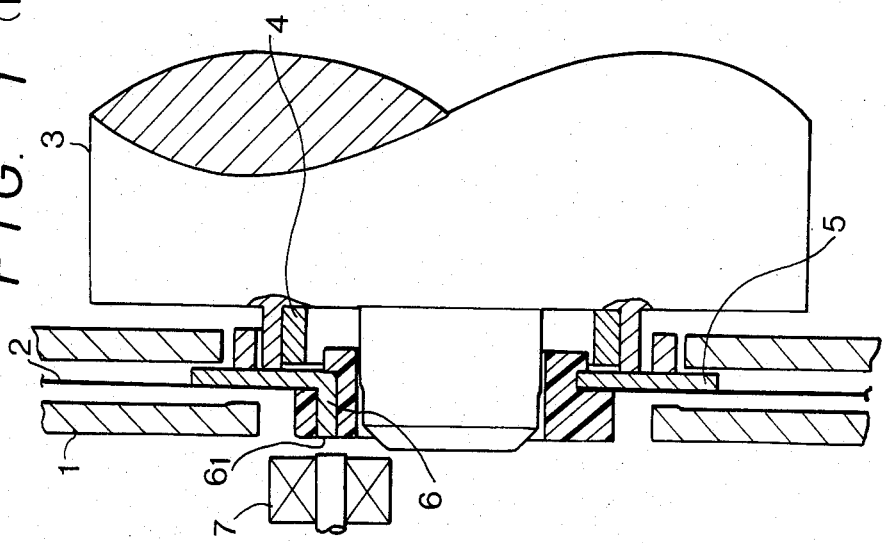
Figure 2:
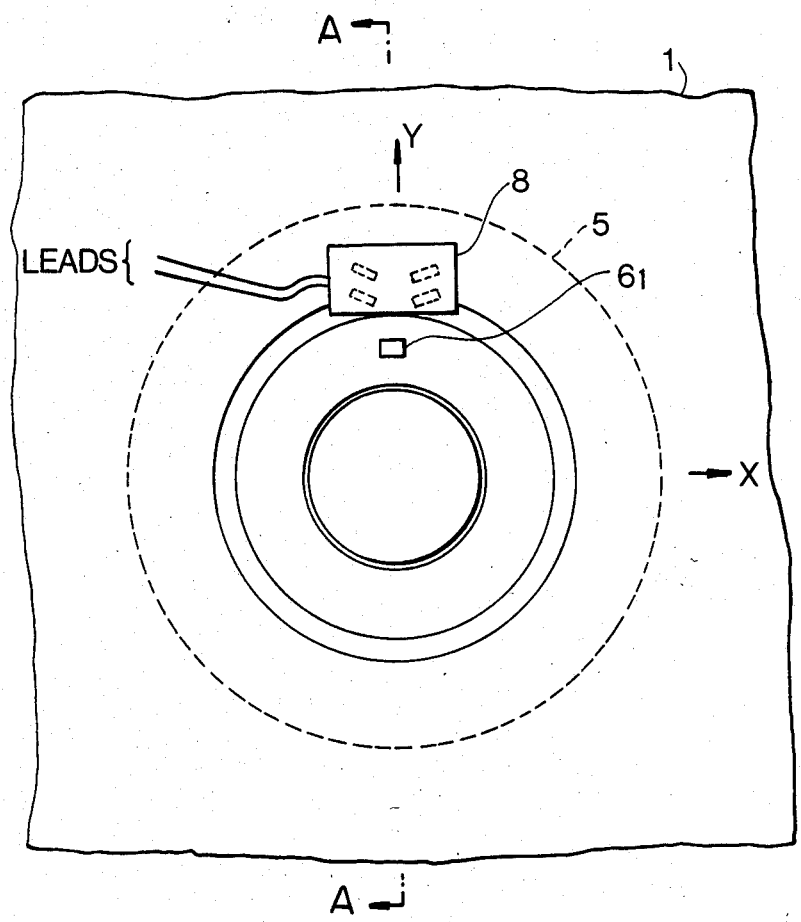
FIG. 2(a) is a front view showing an embodiment of a PG yoke position detecting mechanism according to the present invention.
FIG. 2(b) is a sectional view taken along line A—A of FIG. 2(a)

FIGS. 2(a) and 2(b) illustrate a PG yoke position detecting mechanism embodying the present invention, in which FIG. 2(a) is a front view and FIG. 2(b) a sectional view taken along line A—A of FIG. 2(b). Portions similar to those shown in FIGS. 1(a) and 1(b) are designated by like reference characters and need not be described again. The mechanism of FIGS. 2(a) and 2(b) includes a PG yoke sensor 8 comprising magnetoresistance (hereafter referred to as "MR") elements. The PG yoke sensor 8 has a flux detecting surface $8_1$ lying substantially parallel to the plane of rotation of the recording medium, namely the XY plane in FIG. 2(a), which is perpendicular to the rotary shaft of the motor spindle 3, namely the Z axis. The PG yoke sensor 8 is arranged such that its flux detecting surface $8_1$ is located on the outer side of a circle described by the PG yoke end face $6_1$ when the PG yoke revolves, and such that the flux detecting surface $8_1$ is spaced a short distance away from the PG yoke end face $6_1$ along the Z axis.

Figure 3A:
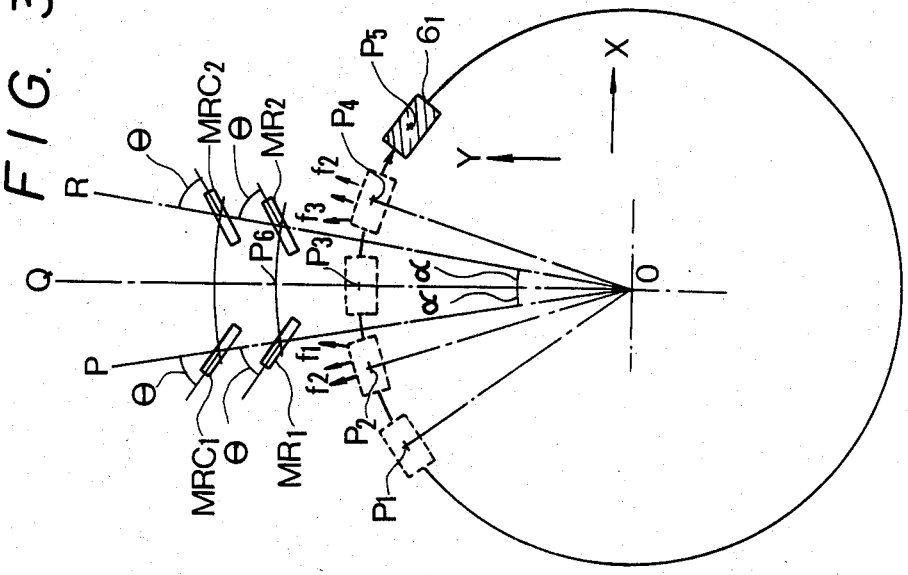
FIG. 3(a) is a front view useful in describing the operating principle of the PG yoke position detecting mechanism of FIG. 2.

FIGS. 3(a) and 3(b) are useful in describing the operating principle of the PG yoke position detecting mechanism of FIGS. 2(a), (b), in which FIG. 3(a) is a front view and FIG. 3(b) a sectional view. In a floppy disc unit of an electronic still camera, it is required that the PG yoke sensor 8 be capable of detecting, and of producing an output signal indicative of, a reference position at which the recording and/or reading of a picture or data begins. This must be accomplished stably and accurately at all times. More specifically, as shown in FIG. 3(a), a signal indicative of detection of the PG yoke position is produced at a precise timing when the center of the PG yoke end face $6_1$ passes through a point $P_3$ on a normal line OQ. In this connection, the standards for PG yokes in common use at the present time call for a PG yoke end face having an area of of more than 0.5 mm² and a plate thickness of 0.5 mm for the yoke 5 formed integral with the PG yoke. In addition, the PG yoke should be as small as possible in order to facilitate centering. For these reasons, a PG yoke having an end face having dimensions of 0.5 mm × 1 mm is commonly employed at the present time. The PG yoke position detection error desired is within is ±1 H, taking into consideration such factors as ambient temperature change and fluctuation due to the presence of noise flux. Note that 1 H is equivalent to 1.37° if expressed in terms of an angle or 63 μs if expressed in terms of time.

Figure 8:
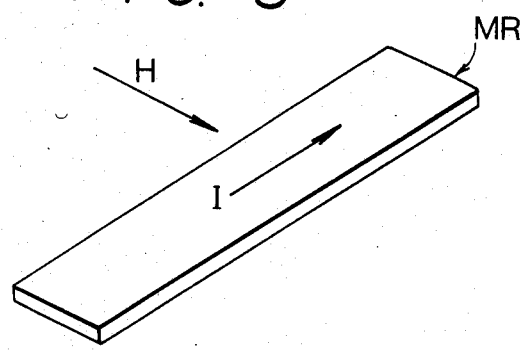
FIG. 8 is a perspective view useful in describing a magnetoresistance element.

In general, an MR element has maximum sensitivity when flux H is applied perpendicular to the element current direction I in a plane parallel to the element plane, as shown in FIG. 8. However, since a radial leakage flux as shown in FIG. 3(b) is obtained from the PG yoke end face $6_1$, various methods can be conceived for the purpose of picking up flux perpendicularly intersecting the MR element current. What is essential in an apparatus of this type is obtaining the maximum S/N ratio of the PG yoke position detection signal. If we assume that the flux detection surface $8_1$ is so placed as to oppose the PG yoke end face $6_1$, as in the prior art, a satisfactory S/N ratio cannot be obtained owing to increased influence of a leakage flux component directly applied to the detection surface $8_1$ from the magnet 4 via the yoke 5, and a leakage flux component from the spindle motor (not shown). In the illustrated embodiment, the influence of these flux components is eliminated by placing the PG yoke sensor 8 on the outer side of a circle described by revolution of the PG yoke end face $6_1$ and arranging the PG yoke sensor 8 is such a manner that the plane of the MR elements is substantially parallel to the PG yoke end face $6_1$. If the distance Zd from the PG yoke end face $6_1$ to the flux detection surface $8_1$ in the above arrangement is held in the neighborhood of, say, 0.1 to 1.5 mm, as shown in FIG. 3(b), then a flux component f substantially parallel to a plane (XY plane) perpendicular to the Z axis, which flux component is contained in the leakage flux from the end face $6_1$, will contribute to PG yoke position detection at a high S/N ratio. Moreover, since the PG yoke sensor 8 is parallel to the magnetic recording medium 2, the space factor is markedly improved to facilitate mounting.

If the PG sensor 8 is disposed in the above manner, PG yoke position detection is possible at a relative high S/N ratio by, say, a single MR element $MR_1$ by arranging the element such that its current direction lies parallel to a tangent to the circle described by revolution of the PG yoke end face $6_1$ and such that the center of the MR element is located at a point $P_6$ on the normal line OQ. With the single MR element $MR_1$, however, satisfactory detection accuracy cannot be obtained in actual practice since the output of the MR element fluctuates due to the influence of ambient temperature change and noise flux. As shown in FIG. 3(a), the PG yoke sensor 8 of the present embodiment includes two MR elements MR1, MR2 arranged on respective normal lines OP, OR each defining an angle $\alpha$ with respect to the normal line OQ. With such a set-up, equal noise flux components which appear in the elements MR1, MR2 are cancelled by taking the difference between the respective output signals that prevail when the PG yoke end face $6_1$ moves in the direction of the arrow. This will have the effect of cancelling the influence of ambient temperature change.

Figure 4:
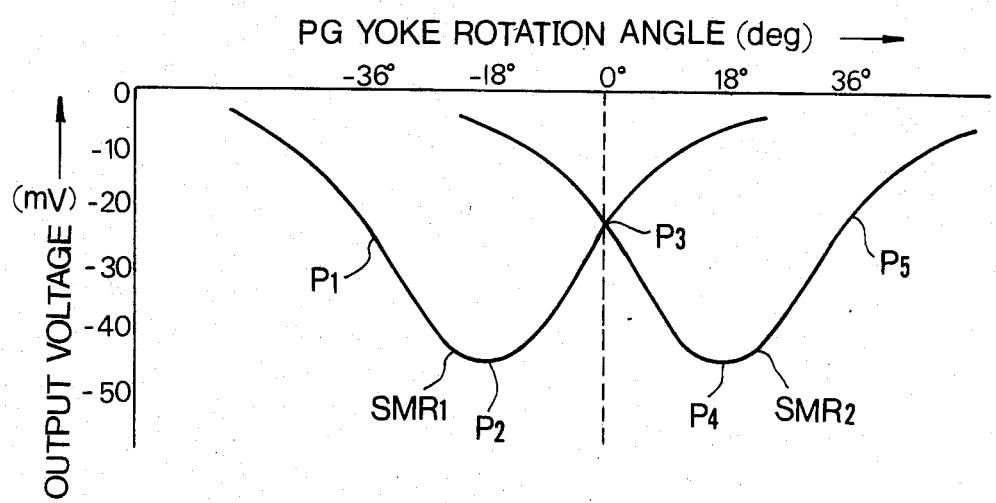
FIG. 4(a) is a timing chart illustrating PG yoke detection signals produced by magnetoresistance elements.
FIG. 4(b) is a timing chart illustrating a PG yoke position signal obtained by an analog-to-digital conversion.
Figure 4:
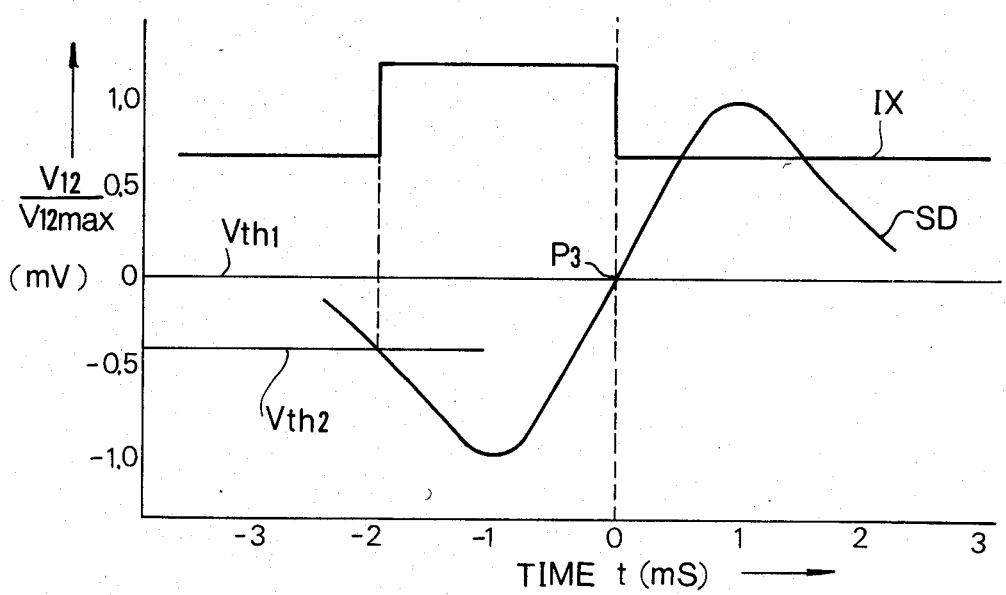

FIGS. 4(a) and 4(b) are timing charts of PG yoke position detection, in which FIG. 4(a) illustrates the outputs of the MR elements MR1, MR2, and FIG. 4(b) illustrates a PG yoke position detection signal. Let us now discuss these timing charts in conjunction with operation of the arrangement shown in FIG. 3(a). When the center of the PG yoke end face $6_1$ is located at point $P_2$, the MR element $MR_1$ produces a negative peak signal $SMR_1$, at which time the angle defined between the normal lines OQ and $OP_2$ is about $-18°$. When the center of the PG yoke end face $6_1$ is located at point $P_4$, the MR element $MR_2$ produces a negative peak signal $SMR_2$, at which time the angle defined between the normal lines OQ and $OP_4$ is about $+18°$. By taking the difference between these two signals $SMR_1$, $SMR_2$, a signal SD is obtained wherein the difference becomes 0 V at timing $P_3$, as shown in FIG. 4(b), providing that the signals $SMR_1$, $SMR_2$ are symmetrical.

Figure 5:
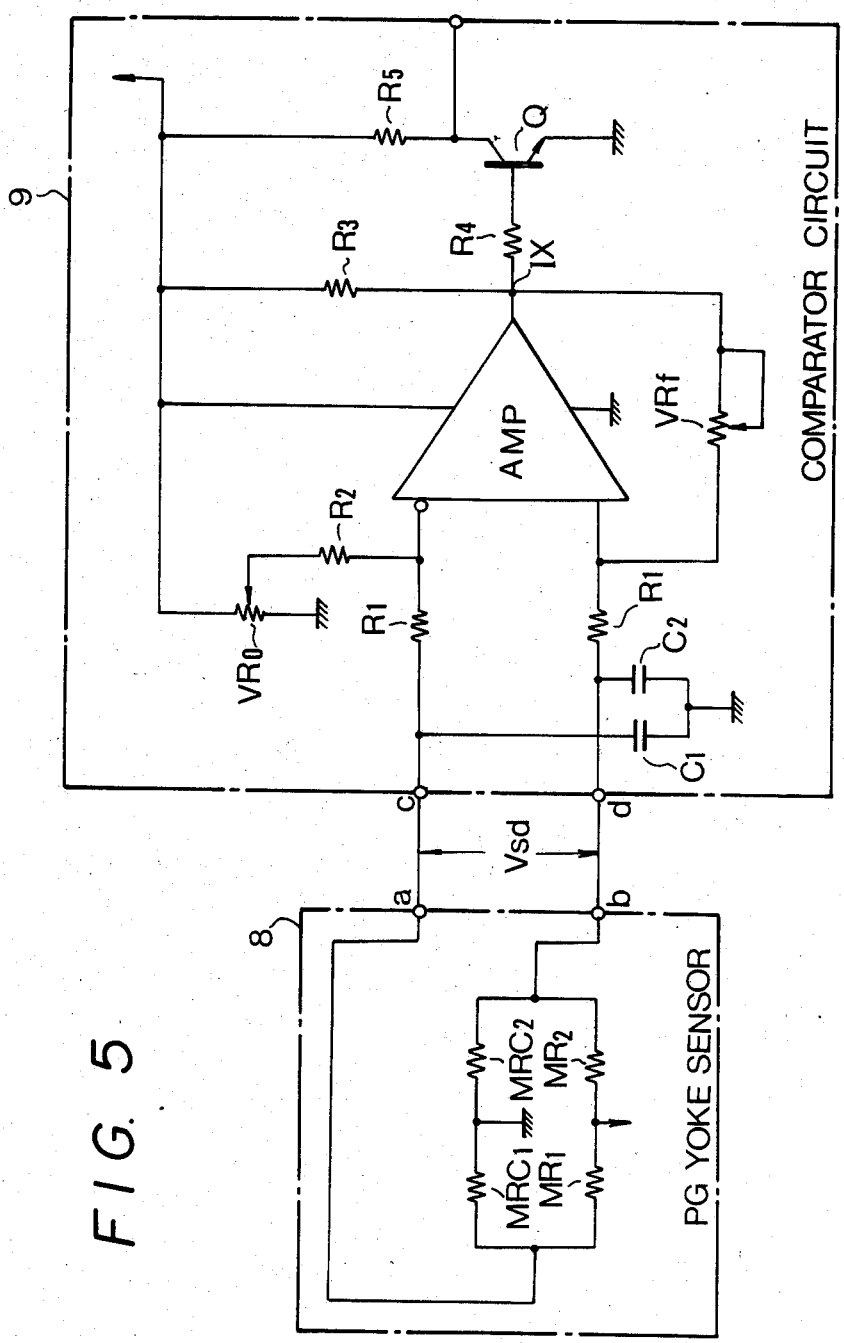
FIG. 5 is a view illustrating an embodiment of a PG yoke position detecting circuit.
Figure 6:
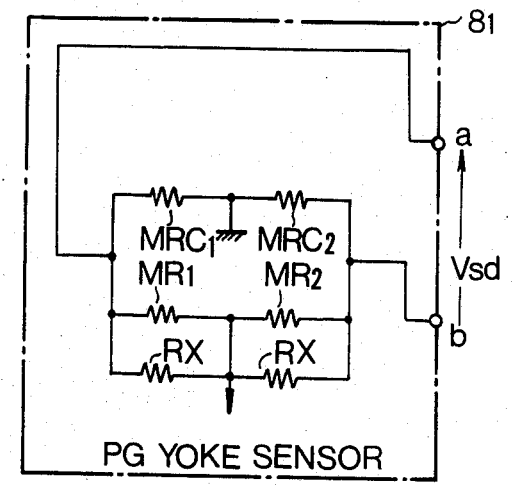
FIGS. 6(a) through 6(d) are circuit diagrams illustrating embodiments of a variety of PG yoke position detecting circuits.
Figure 6:
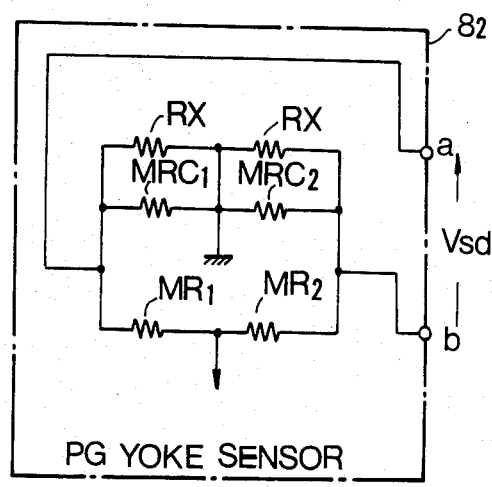
Figure 6:
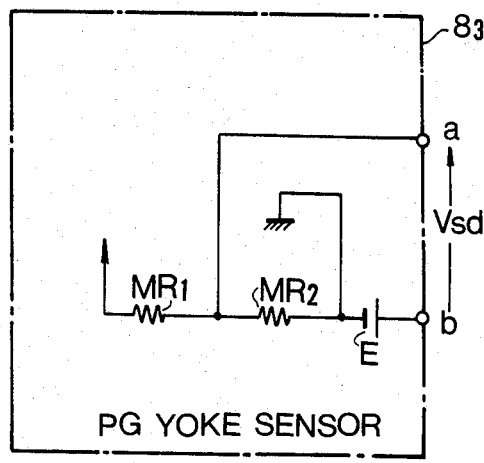
Figure 6:
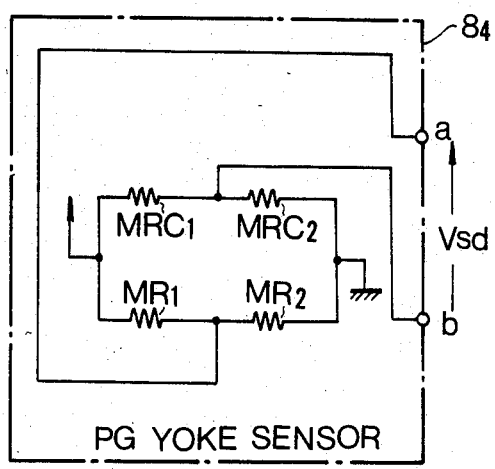

MR element connections of embodiments in accordance with the above-described principle are as shown in FIG. 5 and FIGS. 6(a) through 6(d). In the PG yoke sensor 8 of FIG. 5, the output of MR element $MR_1$ is connected to a terminal a and the output of MR element $MR_2$ is connected to a terminal b, so that a difference signal Vsd is produced across the terminals a, b. Similar arrangements are adopted in FIGS. 6(a) and 6(b). In FIG. 6(c), the MR elements $MR_1$, $MR_2$ are connected in series to obtain a difference voltage, and the difference signal Vsd is obtained between this voltage and a predetermined voltage E. A similar arrangement is adopted in FIG. 6(d).

Obtaining the detection signals $SMR_1$, $SMR_2$ at an even higher S/N ratio depends upon the shape of the PG yoke end face and an angle 8 defined between the current direction of elements MR1, MR2 and normal lines OP, OR, respectively. This will now be described in detail.

Since the MR elements MR1, MR2 are disposed above the PG yoke end face, the flux component f of FIG. 3(b) contributes to a change in the magnetoresistance, as set forth earlier. If the arrangement of FIG. 3(b) is viewed from the front, as shown in FIG. 3(a), it is seen that flux components $f_1$, $f_2$, $f_3$ exist. Let us describe how these flux components are related to an improvement in S/N ratio. Assume that the angle 8 between the current direction of element $MR_1$ and the normal line OP is 90°. In such case, the current direction of element $MR_1$ will be parallel to the tangent to the circle described by the PG yoke end face $6_1$, so that the contributing flux component perpendicular to this direction will be $f_2$. However, experiments have shown that the S/N ratio is not significantly improved by picking up this flux component. The reason for this is believed to be the presence of many noise or bias fluxes having the same component. If the angle $\theta$ between the current direction of element $MR_1$ and the normal OP is made successively smaller than 90°, peaking of the S/N ratio occurs at a certain angle. This angle is related to the shape of the PG yoke end face. If the PG yoke end face is square, then peaking of the S/N ratio will be obtained at an angle $\theta$ in the vicinity of 45°. In the case of the more or less standard rectangular end face used in the present embodiment, peaking is obtained at a slightly larger angle of $\theta$. The reason for this is believed to be that the flux component contributing to an improved S/N ratio is $f_1$ rather than $f_2$, in comparison with the case where the angle $\theta$ made with the normal line OP is 90°. Thus, deciding the shape of the PG yoke end face also decides the value of angle $\theta$. In the illustrated embodiment, the maximum S/N ratio is obtained in the vicinity of $\theta = 55°$, with there being no appreciable change in the S/N ratio within a range of 15° on either side of this value. Since the output of an MR element is not related to flux polarity, flux direction or flux velocity, the above-described relationship will hold between the PG yoke end face $6_1$ at point $P_4$ and the MR element $MR_2$, so that the signals obtained from these elements MR1, MR2 will be symmetrical.

The angle $\alpha$ decides the spacing between the MR elements $MR_1$, $MR_2$ on the circumference of the circle described by the revolution of the PG yoke end face $6_1$. The angle is related to the longitudinal length of the PG yoke end face $6_1$ and the longitudinal length of the MR elements and, electrically speaking, is chosen in such a manner that the signal levels of the detection signals $SMR_1$, $SMR_2$ intersect each other at a suitable value (e.g., one half of the detection signal amplitude), as shown in FIG. 4(a). Note that if the value of angle $\alpha$ is chosen to be too large, it will no longer be possible to obtain a meaningful difference signal of 0 V when the PG yoke end face $6_1$ is at the point $P_3$.

Thus, a noise component common to the MR elements $MR_1$, $MR_2$ is cancelled from the PG yoke sensor of the illustrated embodiment in the manner described above. However, the fact that noise components that take on the same phase on the same normal line in dependence upon the rotational angle of the recording medium must be taken into consideration. In addition, since such noise components vary in dependence upon the rotational angle of the recording medium, the effect upon the elements $MR_1$, $MR_2$ is not always the same. Accordingly, a PG yoke position detection error $\Delta t$ is unavoidable owing to a change in the level of the ideal waveform SD, shown in FIG. 4(b). Therefore, the PG yoke sensor 8 of the illustrated embodiment is provided with noise compensating MR elements $MRC_1$, $MRC_2$ on the respective normal lines OP, OR at locations spaced a predetermined distance (e.g., 1 mm) from the respective MR elements MR1, MR2, as depicted in FIG. 3(a). More specifically, the angle between the MR element $MRC_1$ and the normal line OP is the same as that between the MR element MR1 and this normal line. Likewise, the angle between the MR element $MRC_2$ and the normal line OR is the same as that between the MR element MR2 and this normal line. This arrangement of the MR elements $MRC_1$, $MRC_2$ is very effective with respect to the noise components that assume the same phase on each of the normal line in dependence upon the rotational angle of the recording medium. Moreover, the arrangement is advantageous in that the MR elements $MRC_1$, $MRC_2$ do not detect signal components of the same phase from the PG yoke end face $6_1$.

The noise compensating operation of this arrangement will now be described. Assume that noise signals of the same phase enter the MR elements $MR_1$, $MRC_1$ when the center of the PG yoke end face $6_1$ is at the point $P_2$, and that the noise signal strength is aN for element $MR_1$ and N for element $MRC_1$. The resistance values of these elements will then be as follows:

$$MR_1 = R(1+S+aN) \quad (1)$$

$$MRC_1 = R(1+N) \quad (2)$$

where R is the resistance of the elements $MR_1$, $MRC_1$ when the magnetic field is zero. Connecting these two elements in series and obtaining an output will give $$V = Vin/2\{1 - S/2 + (1-a)N/2\} \quad (3)$$

Note that the noise term will vanish when $a=1$ holds.

The PG yoke sensor 8 in the circuit diagram of FIG. 5 employs this noise compensating method, in which components of the same phase are cancelled when their magnitudes are equal.

It will suffice to insert a resistor RX in parallel with the MR element $MR_1$ when the noise entering the element $MRC_1$ is less than that entering $MR_1$ at $a > 1$. The PG yoke sensor $8_1$ in the circuit diagram of FIG. 6(a) employs this noise compensating method. In this case, the noise component is cancelled if the value of RX is as follows:

$$RX = R/(a-1) \quad (4)$$

It will suffice to insert a resistor RX in parallel with the MR element $MRC_1$ when the noise entering $MRC_1$ is greater than that entering $MR_1$ at $0 < a < 1$. The PG yoke sensor $8_2$ in the circuit diagram of FIG. 6(b) employs this noise compensating method. In this case, the noise component is cancelled if the value of RX is as follows:

$$RX = a R/(1-a) \quad (5)$$

Thus, with the PG yoke sensor 8 of the present embodiment, the position of the PG yoke can be detected in a highly accurate and reliable manner.

The overall PG yoke position detecting circuit of the present embodiment is illustrated in FIG. 5. Here the output signal Vsd of the PG yoke sensor 8 enters a comparator circuit 9. The latter includes amplifier circuitry utilizing an operational amplifier AMP, in which a threshold effect exhibiting hysteresis is provided by adjusting a feedback resistor VRf. In FIG. 4(b), IX represents the output signal of the operational amplifier AMP. When the signal SD (Vsd) drops below a second threshold level $V_{th2}$, the operational amplifier output signal IX rises to logical "1"; when the signal SD rises above a first threshold level $V_{th1}$, the output signal IX reverts to logical "0". Adopting 0V as $V_{th1}$ is advantageous in that if an MR element output varies due to temperature, the influence of this can be avoided.

Figure 7:
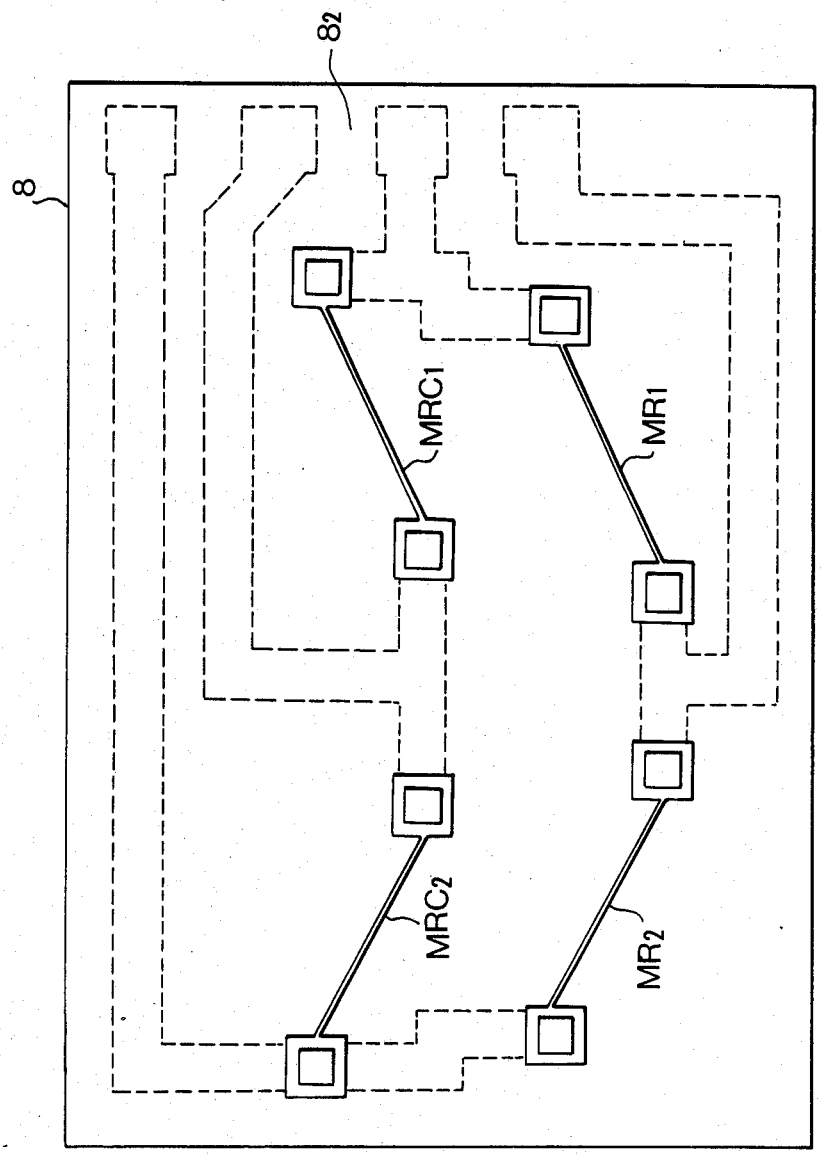
FIG. 7 is a front view illustrating the arrangement of magnetoresistance detecting elements according to an embodiment of the present invention.

FIG. 7 is a front view showing the arrangement of the MR detecion (PG yoke sensor) elements in the present embodiment. Two detection MR elements ($MR_1$ and $MR_2$) and two compensating MR elements ($MRC_1$, $MRC_2$) are arranged on a substrate $8_2$ in accordance with the above-described operating principle. In terms of size, each MR element has a length of 1 mm, a width of 30 $\mu$, and a thickness of 0.03 $\mu$, by way of example.

As mentioned above, the angle $\theta$ at which each MR element is disposed is related to the shape of the PG yoke end face and the longitudinal length of the MR element. In addition, the PG yoke in widest use at the present has an end face with dimensions $0.5 \times 1$ mm, also as set forth earlier. However, standards on floppy discs for electronic video cameras are still changing, and it is anticipated that the PG yoke end face will become smaller in size in order to facilitate the centering of the PG yoke. Taking these points into consideration, the inventors have carried out measurements and experiments to determine the optimum value of the angle 0 using a PG yoke end face of dimensions $0.5 \times 0.5$ mm and MR detecting having a longitudinal length of 0.5 mm. Excellent results were obtained for an angle $\theta$ of $45° + 15°$. With a PG yoke end face of dimensions $0.5 \times 1$ mm and an MR element having a longitudinal length of 0.5 mm, a practical range for the abovementioned angle $\alpha$ was found to be $55° + 15°$ to $45° + 15°$. Accordingly, the acute angle $\theta$ referred to herein preferably has a value within a range of 30° to 70°. For a more compact PG yoke and MR elements having a smaller longitudinal length, the anticipated value of $\theta$ will range from 20° to 70°.

Sensor elements of the aforementioned type can be mounted on various mechanisms or members depending upon the particular apparatus. For example, they can be mounted on the support mechanism of a contact stabilizing portion opposing a magnetic head via the recording medium, on a center hub force-fitting mechanism for forcibly chucking the center hub of the recording medium, or on a cassette accommodating member for accommodating the cassette or hard case.

ADVANTAGES OF THE INVENTION

According to the present invention as described hereinabove, the PG yoke detecting element comprises a magnetoresistance element, so that the amplitude of the element output signal is independent of the rotating speed of the recording medium, namely the traveling speed of the PG yoke. Accordingly, the detecting element and associated circuitry can be used without modification in equipment having various recording medium rotating speeds, thus affording a highly reliable PG yoke position detecting apparatus for general-purpose use.

Further, according to the present invention, using a magnetoresistance element as the PG yoke detecting element eliminates the risk of a reversal in detection signal polarity caused by the pole orientation of the attracting magnet. The result is a PG yoke position detecting apparatus having advantages in terms of manufacture, adjustment and interchangeability.

In accordance with the present invention, the PG yoke detecting element is arranged at a predetermined position to enable extraction of a satisfactory PG yoke detection signal component from magnetic noise. The result is a PG yoke position detecting apparatus having a greatly improved S/N noise ratio.

As many apparently widely different embodiments of the present invention can be made without departing from the spirit and scope thereof, it is to be understood that the invention is not limited to the specific embodiments thereof except as defined in the appended claims.

What we claim is:

1. A PG yoke position detecting apparatus for detecting a rotation reference position of a PG yoke used in detecting a rotation reference position of a recording medium, said apparatus comprising a magnetoresistance element for detecting the PG yoke, said magnetoresistance element being disposed in a plane lying substantially parallel to a plane in which the recording medium rotates, said magnetoresistance element being located outwardly of a circle described by revolution of an end face of the PG yoke and spaced away from the PG yoke end face a prescribed small distance along a rotational axis of the recording medium.

2. A PG yoke position detecting apparatus for detecting a rotation reference position of a PG yoke used in detecting a rotation reference position of a recording medium, said apparatus comprising PG yoke detecting means provided with a magnetoresistance element disposed in plane lying substantially parallel to a plane in which the recording medium rotates and arranged in such a manner that an acute angle is formed between a direction of a drive current that flows through the magnetoresistance element and a normal line from a rotational axis of the recording medium.

3. The PG yoke position detecting apparatus according to claim 2, wherein the absolute value of the acute angle lies in a range of from 20° to 70°.

4. The PG yoke position detecting apparatus according to claim 2, wherein said PG yoke detecting means includes first and second magnetoresistance elements lying on the circumference of a circle the center whereof lies on the rotational axis of the recording medium, and wherein when an acute angle formed between the drive current of said first magnetoresistance element and a first normal line is $\theta$, an acute angle formed between the drive current of said second magnetoresistance element and a second normal line is $-\theta$.

5. The PG yoke position detecting apparatus according to claim 4, wherein an angle formed between the first normal line and a normal line passing through a rotation reference position of the recording medium and an angle formed between the second normal line and the normal line passing through the rotation reference position of the recording medium are symmetrical.

6. The PG yoke position detecting apparatus according to claim 5, wherein the absolute value of the angle formed between the first and second normal lines and the normal line passing through the rotation reference position of the recording medium lies in a range of from 20° to 70°.

7. The PG yoke position detecting apparatus according to claim 2, wherein said PG yoke detecting means includes a plurality of parallel magnetoresistance elements on the same normal line from the rotational axis of the recording medium.

8. A PG yoke position detecting apparatus for detecting a rotation reference position of a PG yoke used in detecting a rotation reference position of a recording medium, said apparatus comprising:

PG yoke detecting means provided with first, second third and fourth magnetoresistance elements disposed in plane lying substantially parallel to a plane in which the recording medium rotates, said first and second magnetoresistance elements being provided at prescribed positions on a first normal line, which forms a prescribed angle with a normal line extending from a rotational axis of the recording medium and passing through a rotation reference position of the PG yoke, and arranged in such a manner that an acute angle is formed between a direction of a drive current that flows through each of said first and second magnetoresistance elements and said first normal line, second third and fourth magnetoresistance elements being provided at prescribed positions on a second normal line, which forms a prescribed angle with said normal line extending from the rotational axis of the recording medium and passing through the rotation reference position of the PG yoke and which is symmetrical with respect to said first normal line, and arranged in such a manner that an acute angle is formed between a direction of a drive current that flows through each of said third and fourth magnetoresistance elements and said second normal line;

a bridge circuit having a first side composed of a series circuit comprising said first and second magnetoresistance elements and a second side composed of a series circuit comprising said third and fourth magnetoresistance elements; and an amplifier circuit for amplifying a difference between a divided voltage resulting from said first and second magnetoresistance elements and a divided voltage resulting from said third and fourth magnetoresistance elements.

* * * * *